June 12, 1962
H. HACK
3,038,342
BALANCING MACHINE
Filed Oct. 16, 1956
3 Sheets-Sheet 1
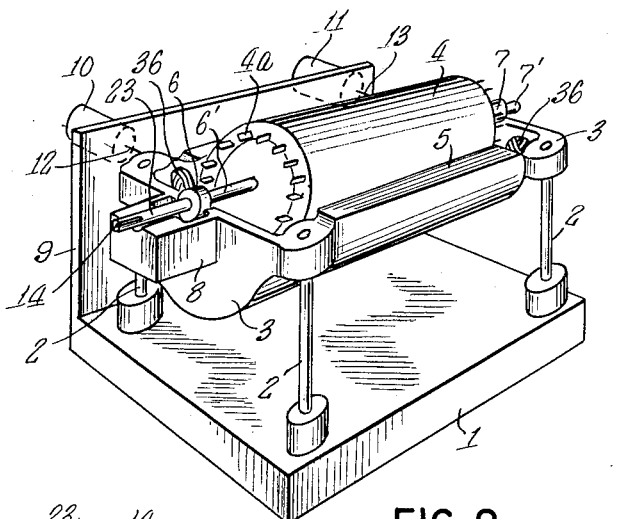
FIG. I
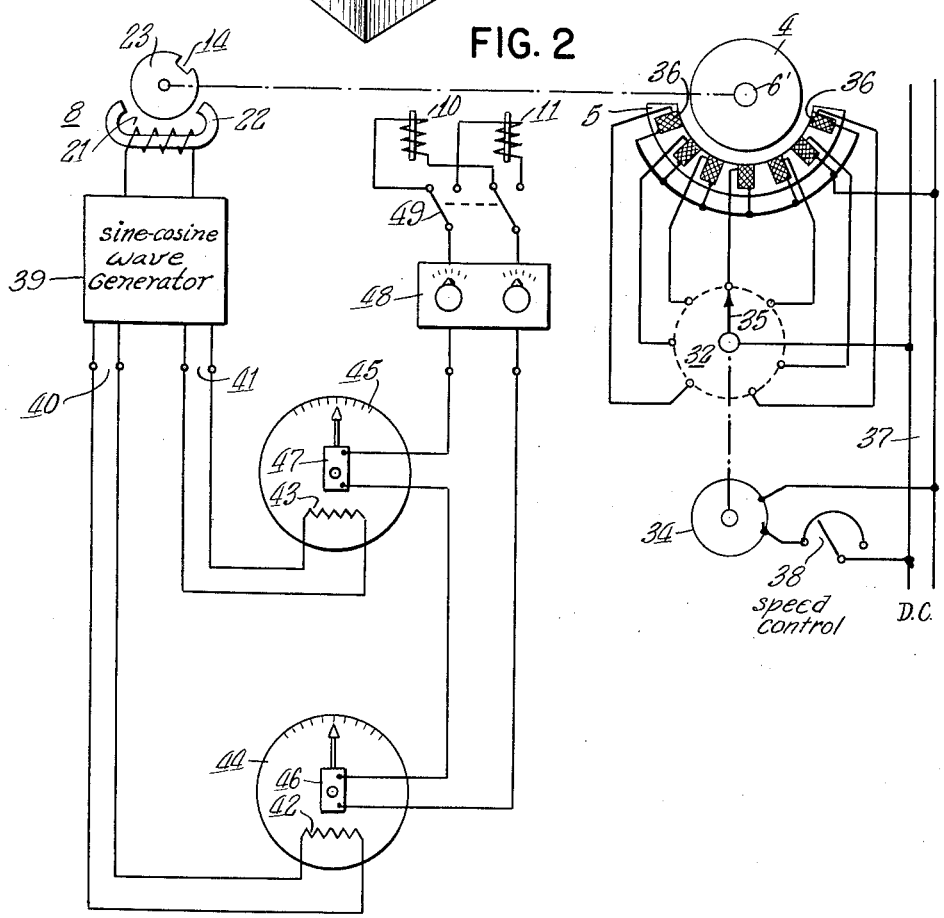
FIG. 2

June 12, 1962  H. HACK  3,038,342
BALANCING MACHINE
Filed Oct. 16, 1956  3 Sheets-Sheet 3

United States Patent Office 3,038,342
Patented June 12, 1962

3,038,342
BALANCING MACHINE
Heinrich Hack, Darmstadt, Germany, assignor to Carl Schenck Maschinenfabrik G.m.b.H., Darmstadt, Germany, a corporation of Germany
Filed Oct. 16, 1956, Ser. No. 616,208
Claims priority, application Germany Oct. 17, 1955
10 Claims. (Cl. 73—462)

My invention relates to machines for analyzing the unbalance of rotatable work pieces such as the rotors of electric motors and generators, crankshafts, fan rotors, pump rotors and the like.

Such balancing machines afford determining the magnitude as well as the angular position of any unbalance with which the rotating workpiece may be affected. The quality of the desired unbalance correction depends upon the degree of accuracy of such unbalance analysis. The requirements thus placed upon balancing techniques are continuously becoming more exacting not only with respect to quality of balance correction but also as to speed of unbalance analysis. Additional problems are posed by the increasing use of assembly-line mass production as well as by the tendency toward increased speeds of the rotating parts of many machines.

It is an object of my invention to cope with, or virtually eliminate, the difficulties arising from the above-mentioned requirements.

According to a feature of my invention, I drive the workpiece, journalled in the vibratorily mounted bearing means of the balancing machine, with the aid of a plurality of electromagnetic field means that are serially arranged in inductive relation to the journalled workpiece and are individually energized in a cyclical sequence by an electric control or distributor device which, in turn, is operated by a speed-controllable drive at an adjusted or regulated speed in synchronism with the phase-angle reference transmitter in the balance analyzing equipment of the machine.

It is known as such to apply an electromagnetic drive in balancing machines particularly designed for balancing the rotors of electric motors. However, such electromagnetic balancing-machine drives have not been used in modern manufacture because such drives, as heretofore known, were too imperfect to afford rapid or sufficiently accurate balancing of the rotors. High-quality balancing at high speed can be attained only if the measuring run of the workpiece can be accurately controlled from start to finish of the measuring run. Since further a complete unbalance analysis requires not only determining the amplitude of an unbalance-responsive oscillation but also accurately locating the angular unbalance position relative to the workpiece, an electromagnetic drive as such is not satisfactory unless means are devised which secure a precisely controllable travelling magnet field to serve as the driving means and which also secure a strictly synchronous run of the workpiece relative to a phase-angle reference transmitter during the entire measuring run regardless of the selected speed of workpiece rotation and regardless of changes in such speed.

It is therefore another object of my invention to provide an electromagnetic balancing-machine drive that fully meets the just-mentioned requirements and that, by virtue of the cyclical operation of the above-mentioned control or distributor device, produces a driving magnetic field rotating at a speed accurately controllable in accordance with any desired speed value within the available limits and in strict synchronism and fixed phase relation to the phase-angle reference transmitter of the balance analyzing equipment.

According to another feature of my invention, the travelling-field means for driving the workpiece electromagnetically are struturally joined with the vibratorily supported journalling means for accommodating the workpiece so that the field device vibrates together with the journalling means.

According to another feature of my invention, the electromagnetic field means are designed to form part of a trough-shaped structure which is open toward one side in order to facilitate rapid insertion and removal of the workpiece. However, the open field structure is not an indispensible condition for all applications of the invention. For accurate determination of the angular position of unbalance, it is important, according to a more specific feature of my invention, to couple the phase-angle reference transmitter, such as an alternating-current generator or a photo-electric pulse generator, with the rotating member of the distributor device which controls the travelling speed of the rotating magnetic field driving the workpiece. In this manner, any workpiece consisting of, or containing, ferromagnetic material so as to be suitable to be driven electromagnetically can be accurately balance-analyzed by a simple and reliable operation at any desired constant speed of rotation either in sub-critical or super-critical speed ranges, because in a machine with electromagnetic drive according to the invention any reactive or biasing forces originating in the electromagnetic devices and detrimental to the balance-measuring result are made ineffective. The angular position of unbalance in machines according to the invention can be determined in any suitable known manner, for instance by the above-mentioned photoelectric pulse generator or any other device responsive to the scanning of a mark on the workpiece, or also with the aid of an auxiliary electric alternator, preferably a sinusoidal-current generator.

The above-mentioned objects, advantages and features, as well as the more specific features of the invention set forth with particularity in the claims annexed hereto, will be apparent from the embodiments of the invention illustrated schematically on the drawings by way of example and described hereinafter.

FIG. 1 is a perspective view of a balancing machine equipped with electromagnetic drive means according to the invention.

FIG. 2 shows schematically some of the components of the same machine together with a circuit diagram of appertaining electric equipment.

Figure 3:
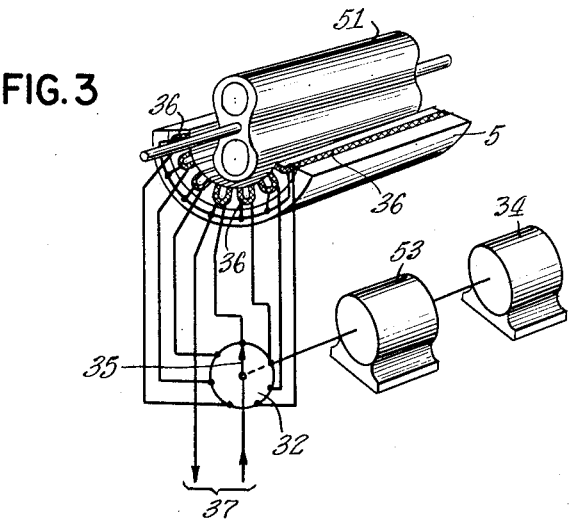
FIG. 3 shows schematically a portion of a machine similar to that of FIG. 1 but modified as regards some components and applied to a workpiece of different shape than shown in FIG. 1.

The machine illustrated in FIG. 1 has a base 1 which supports four vertical spring rods 2 of round cross section on which a workpiece-receiving structure 3 is vibratorily supported. The structure 3 comprises a magnetic field portion 5 and forms an upwardly open trough which readily permits inserting and removing the workpiece 4. The workpiece 4 shown in FIG. 1 consists of the rotor of an electric motor and is equipped with fan blades 4a. The shape of the trough structure 3 is adapted to the particular shape of the rotors to be balanced and is preferably made exchangeable on the springs 2 for other workpiece-receiving trough structures adapted to workpieces of different size or shape.

The magnetic field portion 5 of the receiver structure 3 consists preferably of magnetizable material such as iron and is provided with a number of induction coils 36 (FIGS. 1, 2, 3). As will be explained, these coils are sequentially energized to produce a continuously relocated or "travelling" magnetic field which, during the entire measuring run, maintains the workpiece 4 in controllable or regulatable rotation. Mounted on the two axial ends of the receiver device 3 are respective bearings 6 and 7 for journalling the shaft ends 6' and 7' respectively of the workpiece 4.

Mounted on receiver structure 3 adjacent to the bearing 6 is a phase-reference transmitter 8 which, in the embodiment of FIGS. 1 and 3 is essentially an inductive pulse transmitter, although a photoelectric or any other pulse generator may be used instead. During rotation of the workpiece, the transmitter 8 issues impulses when the rotor passes through a given phase position, and these pulses are used for determining the angular position of unbalance, as will be more fully explained below.

Mounted on the rear side of the base 1 is a carrier 9 which supports two oscillation pickups 10 and 11. The respective feeler members 12 and 13 of pickups 10 and 11 are in engagement with the receiver structure 3. When, during rotation of workpiece 4, the structure 3 is excited to perform horizontal oscillations due to any unbalance with which the workpiece 4 may be affected, then such oscillations are transmitted to pickups 10 and 11 and are converted into corresponding alternating voltages whose amplitude is proportional to the magnitude of the unbalance oscillations and hence of the unbalance of the workpiece in the respective radial plane in which each particular pickup is located. The pickups may be of any suitable type. For instance, the conventional pickups having permanent field magnets and having moving coils connected to the pickup feeler member may be used, although piezo-electric or other force measuring pickups are likewise applicable.

Since the receiver device 3 is upwardly open, the insertion and removal of the workpiece 4 can be effected automatically or manually by a few manipulations and at great speed. After inserting the workpiece 4, the rotating-field device 5 is energized from a current supply line 37 (FIG. 2). The supply of current to the coils 36 is cyclically controlled by a distributor device 32 which, according to FIG. 2, is designed as an electric contact device. The rotating contact member 35 of the distributor is driven from an electric motor 34 which is shown to be energized from the line 37 through a speed-control rheostat 38.

The induction coils 36 follow each other in a sequential physical arrangement that extends about the axis of the workpiece along not more than one-half of the periphery (FIGS. 2, 3). The individual coils 36 extend lengthwise of the workpiece axis, if desired, in an arrangement particularly adapted to the geometric shape of the workpieces to be balanced. Energization of coils 36 under cyclical control by the distributor device 32 may be by direct current. The sequence of energization of the coils 36 is not necessarily the sequence of their physical arrangement, but their energization in a predetermined sequence produces a series of continuously relocated magnetic fields which "travel" from one coil to another in the desired sequence to suit the particular shape or contour of the workpiece. Depending upon the particular balancing method to be employed, the distributor device 32 is driven from motor 34 either at supercritical speed or below the critical speed of the workpiece.

During operation the rotating magnetic field produced by the coils 36 and acting upon the workpiece 4 has the effect of operating the workpiece as a synchronous motor so that it rotates at a speed which is accurately controllable by adjusting the speed of the motor 34 driving the distributor 32. Maintenance of this workpiece speed is strictly and constrainedly enforced. Any unbalance of workpiece 4 will cause the journalling structure or receiver 3 to perform oscillations in the two planes determined by the location of the pickups. The pickups then produce respective voltages dependent upon the magnitude of the workpiece unbalance. This unbalance is measured in the known manner, for instance by means of one or more wattmeters. During the measuring run, the phase transmitter 8 issues a voltage or a series of pulses in synchronism with the rotation of the workpiece. By properly combining the pickup voltage and the voltage issuing from the phase transmitter 8, a complete electric unbalance analysis can be performed as is well known as such.

The provision of an inductive pulse generator as shown at 8 in FIGS. 1 and 2 has been found particularly suitable for securing strict synchronism between workpiece rotation and phase-reference signals. The phase transmitter 8 comprises a coil 21 mounted on an iron core 22. The core 22 has a gap near the end 23 of the shaft 6. The shaft end 23 is provided with a longitudinal groove 14. As long as the full cross section of the shaft end is in front of the two pole faces of the iron core 22, the magnetic flux traversing the coil 21 is larger than at the moment when the groove 14 passes by the gap. This produces in coil 21 a single change in voltage per revolution, so that the frequency of the pulses is equal to the speed of rotation of the workpiece 4. The voltage pulses thus generated in coil 21 are available as a phase-reference voltage for balance analysis, for instance in an analyzing system as exemplified in FIG. 2 and described presently.

According to FIG. 2, the pulses issuing from pulse generator 8 are applied to an amplifying device 39 which issues a sine-wave current at terminals 40 and a cosine-wave current at terminals 41. The components, preferably electronic circuits, for thus amplifying and shaping the pulses, are not essential to the invention, and since they are known as such and available from manufacturers of electronic equipment, they require no detailed description and illustration. The two synchronous current waves, 90° phase displaced relative to each other, are passed through the stationary current coils 42 and 43 of respective wattmetric instruments 44 and 45. The moving coils 46 and 47 of the respective instruments are both connected through an adjustable electric potentiometer network 48 and through a selector switch 49 to a selected one of the two pickups 10 and 11 at a time. When switch 49 is set to connect pickup 10 to the moving coils 46 and 47, the potentiometer device 48 can be set in known manner to make the voltage at coils 46, 47 dependent upon unbalance vibrations in the plane of pickup 10 only; whereas when pickup 11 is selected by switch 49, only the unbalance in the plane of the latter pickup can be made effective upon the coil voltage by correspondingly setting the potentiometer device. As a result, for each setting of switch 49, the two instruments 44 and 45 indicate the unbalance in the plane of the selected pickup by two coordinate components, preferably the vertical component and the horizontal component of unbalance.

The results of such analysis are then applied to a subsequent unbalance-correcting operation, which, if desired, may be carried out automatically. Unbalance may be corrected, for instance, by drilling or milling material away from the workpiece at the proper location and in the proper amount, or by welding material to the workpiece at the proper location and in the proper quantity.

The machine illustrated in FIG. 3 is partly similar to that of FIG. 1, the same reference numerals being used for corresponding components respectively. In the following respects, however, the embodiment of FIG. 3 differs from the one described above.

The workpiece 51 shown in FIG. 3 consists of a rotor for a blower or hydraulic displacement pump. While according to FIGS. 1, 2 the phase transmitter 8 is essentially a pulse generator, FIG. 3 shows a phase transmitter consisting of an alternating-current generator 53 of the dynamo-electric type, and this generator is driven from motor 34 together with the movable contact 35 of the distributor 32 and hence in strict synchronism and fixed phase relation to the "travelling" field produced by field coils 36. Hence, the alternating voltage of generator 53 is also in accurate synchronism with, and has a fixed phase relation to, the "travelling" or continuously relocated field driving the workpiece. The generator 53 supplies two measuring voltages $v$ (vertical) and $h$ (horizontal) which are 90° phase displaced relative to each other as is required for measuring the horizontal and vertical components of unbalance in each individual pickup plane. Since the movable contact 35 of control device 32 energizes the respective coils 36 in a fixed sequence so that the workpiece is forced to continuously change its angular position relative to the one coil circuit supplied with current at a time, the workpiece runs strictly in synchronism with the control device 32 and hence also with the phase-transmitting generator 53. It is possible to have the voltages $v$ and $h$ for measuring the angular position of unbalance directly indicated by an instrument, for instance a wattmeter, without electronic amplification of these voltages, as is the case in the electric system shown in FIG. 4 and described presently.

Figure 4:
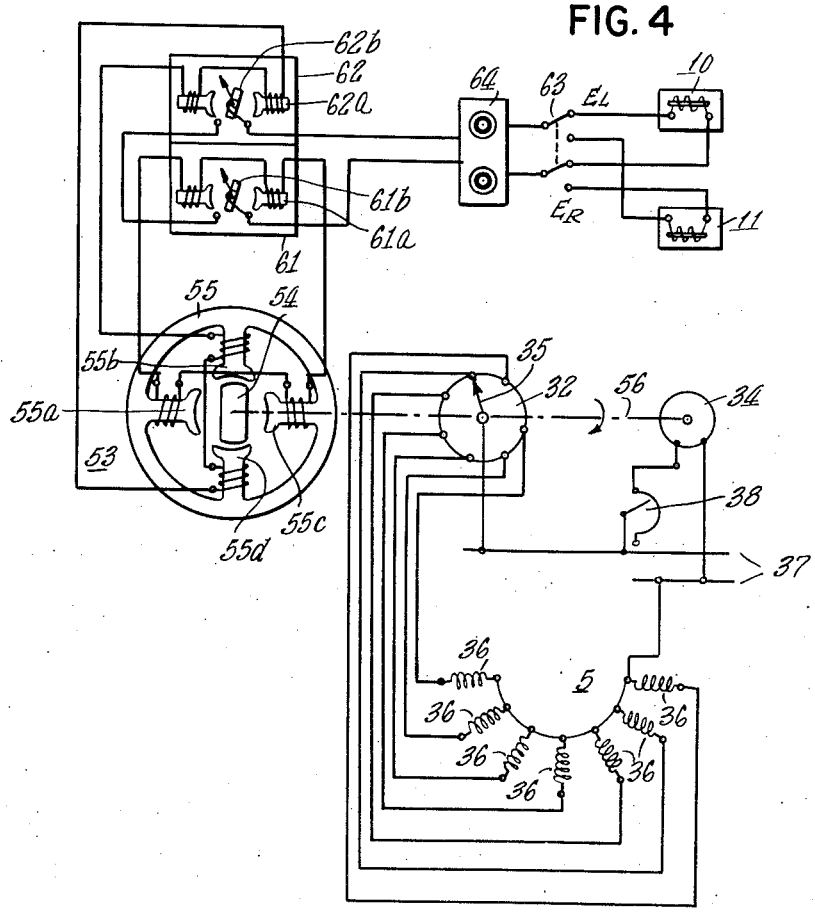
FIG. 4 is an electric circuit diagram relating to the machinery of FIG. 3.

The system exemplified in FIG. 4 is suitable for determining the workpiece unbalance in each of two axially spaced correction planes by measuring the respective magnitudes of a horizontal and a vertical unbalance component, or by producing a resultant from such two components, for instance with the aid of optical means according to U.S. Patent 2,722,830.

The phase-reference generator 53 (FIGS. 3, 4) comprises a permanent-magnet rotor 54, and a stator 55 with two horizontal poles 55a, 55c and two vertical poles 55b, 55d. The motor 34 drives the rotor 54 and the movable contact member 35 of control device 32 through a common shaft 56. The motor 34 is energized through a speed control rheostat 38 from a direct-current line 37 which also energizes the coils 36 of the electromagnetic trough structure 5. Due to operation of the control device 32, the coils 36 are energized in the proper sequence to rotate the workpiece as explained above.

The two 90° displaced sine-wave currents of generator 53 pass through the respective stationary current coils 61a and 62a of wattmetric instruments 61 and 62. Wattmeter 61 thus receives the phase-reference current for measuring the horizontal unbalance component, and wattmeter 62 the current for measuring the vertical component. The moving coils 61b and 62b of the respective wattmeters receive voltage from a selected one of the two dynamic oscillation pickups 10 and 11, depending upon the setting of a selector switch 63. A potentiometer-network device 64, as generally used for such purposes, serves to compensate the system so that it responds to unbalance in only the selected one correction plane ($E_L$ or $E_R$) at a time. For instance, when switch 63 is set to position $E_L$ as shown, only the pickup 10 in the left correction plane is effective to control the voltage impressed upon the moving coils of the two wattmeters, and the potentiometric device 64 is then to be adjusted so as to prevent the measurement from being affected by any unbalance other than occurring in the left correction plane. However, as regards the balance analysis as such, the above described means and method are well known in the art and are mentioned only for the sake of completeness. It is also known that a single wattmetric instrument is sufficient if the two-position selector switch is substituted by a four-position selector switch. In this respect, reference may be had, if desired, to U.S. Patents 2,706,399 and (my application Serial No. 238,649, filed July 26, 1951), now Patent No. 2,810,307.

The cross section of the workpiece 51 shown in FIG. 3 is non-circular. The fact that this workpiece, driven as described above, will rotate in synchronism with the rotating magnetic field is a consequence of its particular shape. If the workpiece, like the rotor 4 in FIG. 1, is rotationally symmetrical (circularly cylindrical), then some magnetic polarization must be effective in order to obtain strictly synchronous rotation. For this purpose, a rotor of the type shown in FIG. 1 can be premagnetized to have remanent or permanent magnetism sufficient for the desired polarization. Thus premagnetized, the induction coils attract the polarized areas of the workpiece in regular sequence and place it into the above-described accurately controllable and regulatable rotation in synchronism with the phase-reference pulse transmitter or generator and in a fixed phase position relative thereto.

Figure 5:
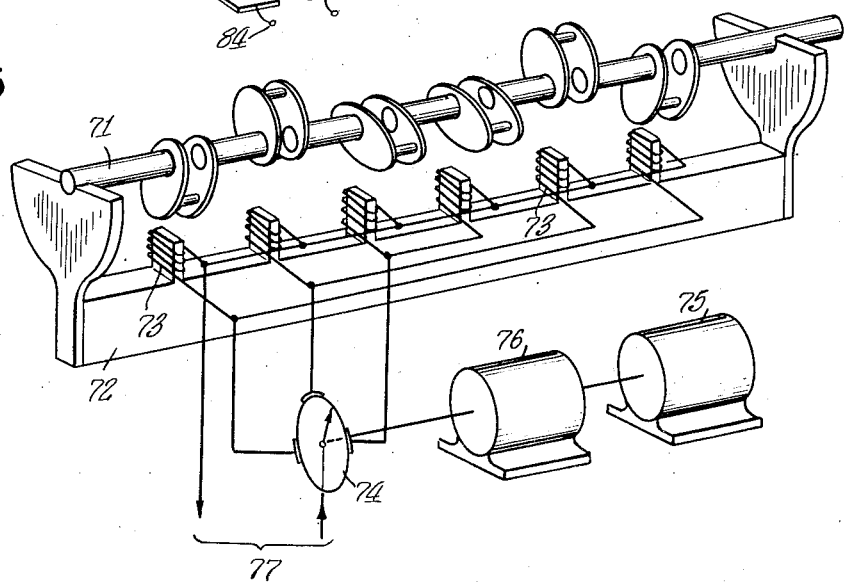
FIG. 5 shows a portion of the balancing machine modified for use with crank shafts.

According to FIG. 5, a crank shaft 71 for a six-cylinder engine is journalled in a receiving or journalling structure 72 which corresponds to the receiving device 3 in FIG. 1 and is similarly supported for unbalance-responsive oscillation, the oscillatory supporting means as well as the vibration pickups being not illustrated in FIG. 5. The journalling structure 72 is provided with six individual induction coils 73 distributed along the axis of rotation of workpiece 71. The coils 73 are located in the respective crank-pin planes of the crank shaft 71. The control device 74 for sequentially energizing the six coils 73 is designed as a distributor contact device and connects the coils 73 in pairs sequentially to voltage from a current supply line 77. This produces a travelling magnetic field which causes the crank shaft to rotate because each individual coil attracts the next arriving crank pin in the sequential order determined by the operation of device 74. The movable contact member of distributor device 74 is driven from a speed-controllable motor 75 which is also directly connected with the shaft of an alternating-current generator 76 serving as the phase transmitter of the unbalance analyzing equipment. As a result, a synchronous run of generator 76 relative to the workpiece 71 is secured. The driving speed of motor 76 is adjusted to the desired rotating speed of the workpiece.

While in the illustrated embodiments the control device 32 or 74 consists of a rotary distributor switch which connects the current supply line in the proper sequence and at the proper time with the respective electromagnetic field means, the control device may also consist of an electric generator or dynamo which has its output circuits or phases connected with the respective field coils and which, driven by a speed-controllable motor, is rated to supply the entire power demand for driving the workpiece.

For accurate measurement of unbalance, the travelling field device should be arranged so that it can oscillate together with the rotatable workpiece. Otherwise there may be error-producing effects of the magnetic field, such as return-motion forces, damping and the like.

Figure 6:
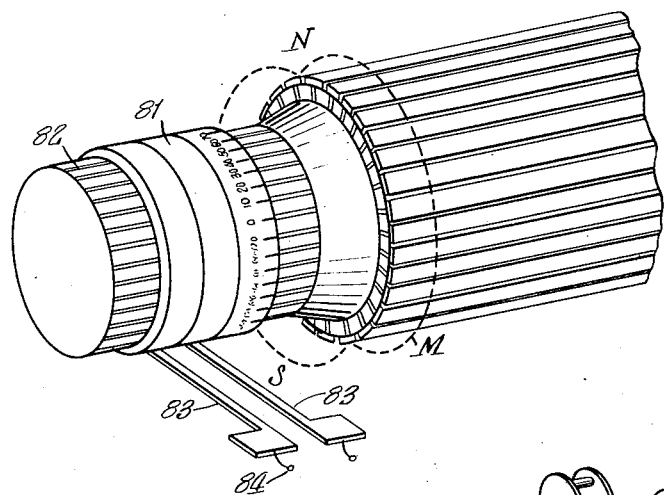

It has been mentioned above that when balancing a workpiece of rotationally symmetrical shape, such as the rotor of a dynamo-electric machine of the round-rotor type, a magnetic polarization of the workpiece is necessary for securing its rotation in strict synchronism with the rotating magnetic field. However, when the rotor to be balanced is equipped with a collector or commutator, another way of obtaining polarization and synchronous run is available and will be described with reference to FIG. 6. For driving the illustrated rotor in a balancing machine according to the invention, two mutually insulated slip rings 81 are mounted on the collector 82 of the rotor and are electrically connected with one pair of the rotor windings. The machine is equipped with two contact brushes 83 which are in sliding engagement with the respective slip rings 81 and are connected at terminals 84 to a direct-current supply. As a result, the pair of rotor windings connected to respective slip rings 81 is energized by direct current, thus producing during rotation of the armature a constant and continuous magnetic field, as indicated by the broken line M, with a north pole N and a south pole S which secure the desired rotation in strict synchronism with the rotating magnet field produced by the induction coils 36 (FIGS. 2, 3).

Figure 7:
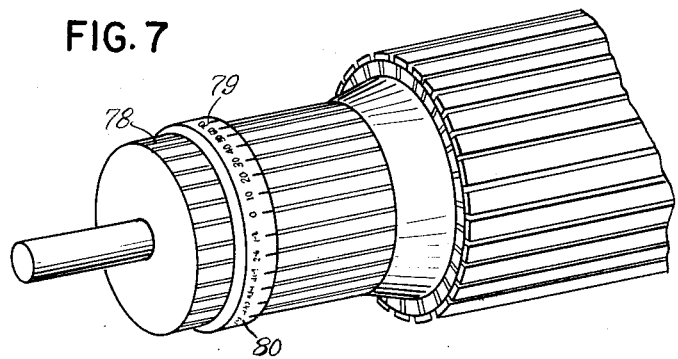
FIGS. 6 and 7 illustrate respective details applicable with a machine according to FIG. 1 when applying the machine for the balancing of dynamo-electric rotors of the collector type.

Another way of using the machine according to the invention is to drive the workpiece in asynchronous relation to the rotating magnetic field controlled by the control device 32 or 74, in which case a polarization of the workpiece is not needed. For instance, when the workpiece to be balanced is the rotor of a squirrel-cage motor, no polarization is required to make the rotor rotate under the effect of the rotating magnetic field. In such cases, however, the rotation of the workpiece involves a certain amount of slip relative to the rotation of the driving field. A similar operation is suitable for the balancing of dynamo-electric rotors having a commutator or collector. In such cases, the collector 78 is short-circuited by a conducting ring 79 as illustrated in FIG. 7. This has the effect that the rotor will run in asynchronous relation to the driving field. The ring may carry a series of marks 80 to permit readily recognizing the angular position of unbalance. In all such cases of asynchronous or induction-motor operation of the workpiece, the phase reference transmitter is not connected with the drive motor (54) as shown in FIGS. 3, 4 but must be connected with the shaft of the workpiece in accordance with the example illustrated in FIGS. 1 and 2. That is, for asynchronous operation of the workpiece, a photoelectric or other pulse transmitter, such as shown at 8 in FIGS. 1, 2 may be used or, if a dynamo-electric phase transmitter is preferred, it must be connected with the workpiece shaft to rotate in strict synchronism therewith.

It will be obvious to those skilled in the art, upon a study of this disclosure, that my invention permits of various modifications and may be embodied in devices other than those particularly illustrated and described, without departing from the essence of my invention and within the scope of the claims annexed hereto.

I claim:

1. A machine for balancing crankshafts and the like workpieces having angularly displaced salient portions, comprising vibratorily mounted journalling means for the workpiece to be balanced, a plurality of electromagnetic field means serially arranged in inductive relation to the journalled workpiece for driving the workpiece, balance measuring means having pickup means responsive to vibration of said journalling means to provide intelligence indicative of workpiece unbalance and having reference transmitter means to provide intelligence indicative of the phase of workpiece rotation, an electric control device having a distributor connected with said respective field means in a predetermined cyclical sequence for sequentially individually energizing said field means to produce a continuously relocated magnetic field restrainedly driving the workpiece, and speed-controllable drive means drivingly connected with said control device, said reference transmitter means being coupled with said drive means to operate in synchronism with the rotation of the workpiece, said electromagnetic field means comprising pairs of inductance coils aligned lengthwise of the axis of said journalling means to inductively act upon respective salient portions of the workpiece.

2. A machine for balancing rotatable workpieces, comprising journalling means for the workpiece to be balanced, a plurality of electromagnetic field means structurally joined wtih said journalling means and serially arranged in inductive relation to the workpiece for driving action upon the workpiece when journalled in said journalling means, said journalling means being adapted for disengagement from the workpiece, and said field means extending over not more than one-half of the periphery of the workpiece when journalled so as to permit insertion and removal of the workpiece relative to said journal means and field means, electric energizing means having a controllable current distributor device electrically connected with said respective field means in a predetermined cyclical sequence for sequentially energizing said field means to drive the workpiece in said journal means at a speed controlled by said distributor device, and unbalance measuring means operatively connected with said journal means for response to oscillations caused in said journal means by unbalance of the rotating workpiece.

3. A machine according to claim 2, wherein the workpiece is the rotor of an electric motor having a commutator with slip rings, comprising direct-current supply means having brush contacts engageable with said respective slip rings for energizing the rotor, whereby a continuous magnetic field of the rotor, coacting with said field means, is maintained during rotation.

4. A machine according to claim 2, wherein the workpieces are the rotors of electric commutator motors, comprising a short-circuiting ring coaxially mounted on the commutator portion of the workpiece rotor.

5. A machine according to claim 2, wherein the workpieces are the rotors of commutator-type electric motors, comprising a short-circuiting ring coaxially mounted on the commutator portion of the workpiece rotor and having a peripheral row of markings, said unbalance measuring means having sensing means to provide intelligence indicative of workpiece unbalance and having angle-indicating means of which said ring forms part to indicate phase position of unbalance.

6. A machine for balancing rotatable workpieces, comprising journalling means for the worpiece to be balanced, electromagnetic field means having magnetizable structure rigidly joined with said journal means and having a plurality of field coils sequentially arranged in inductive relation to the workpiece for driving action upon the workpiece when journalled in said journalling means, said journalling means being adapted for disengagement from the workpiece, and said field means extending over not more than one-half of the periphery of the workpiece when journalled so as to permit insertion and removal of the workpiece relative to said journal means and field means, balance measuring means having oscillation-responsive pickup means to provide intelligence indicative of workpiece unbalance and having reference transmitter means to provide intelligence indicative of the phase of workpiece rotation, an electric control device having a current supply circuit and having a cyclical distributor connecting said supply circuit with said respective coils in a controlled predetermined cyclical sequence for sequentially energizing said coils to drive the workpiece in synchronism with the cycle of said distributor, and a speed-controllable drive mechanically connected with said distributor device and mechanically connected with said transmitter means for driving both in synchronism with each other.

7. In a balancing machine according to claim 6, said plurality of electromagnetic field means comprising at least three coils sequentially arranged and connected to said distributor device for energization in a given cyclical sequence, said field means forming together with said journalling means a structure open on one side for insertion and removal of the workpiece in a radial direction relative ot the journalling axis.

8. In a balancing machine according to claim 6, said sequential arrangement of field coils extending peripherally of the workpiece.

9. In a balancing machine according to claim 6, said arrangement of field coils extending longitudinally of the workpiece.

10. A machine for balancing rotatable workpieces, comprising vibratorily mounted journalling means for the workpiece to be balanced, a plurality of electromagnetic field means serially arranged in inductive relation to the workpiece when journalled and covering in totality a peripheral space less than one-half of the periphery of the workpiece when journalled, said field means having respective energizing circuits and being structurally joined with said journalling means to vibrate together therewith, balance measuring means having pickup means responsive to vibration of said journalling means to provide intelligence indicative of workpiece unbalance and having reference transmitter means to provide intelligence indicative of the phase of workpiece rotation, current supply means, a rotary electric contact device having distributor contacts connecting said energizing circuits with said current supply means in a controlled predetermined cyclical sequence for energizing said field means in said predetermined sequence to produce a progressively relocated field travelling relative to at least a portion of the workpiece to drive the workpiece in synchronism with the operating cycle of said distributor contacts, and a motor drivingly connected with said contact device and with said transmitter means.

References Cited in the file of this patent

UNITED STATES PATENTS

| | | |
|---|---|---|
| 730,891 | Eickenmeyer | June 16, 1903 |
| 1,095,586 | McCollum | May 5, 1914 |
| 1,254,902 | Hale | Jan. 29, 1918 |
| 1,551,347 | Trombetta | Aug. 25, 1925 |
| 1,652,502 | Soderberg | Dec. 13, 1927 |
| 2,394,411 | Tolman | Feb. 5, 1946 |
| 2,451,863 | Oakley | Oct. 19, 1948 |
| 2,731,835 | Hellar et al. | Jan. 24, 1956 |
| 2,844,794 | Wright et al. | July 22, 1958 |

FOREIGN PATENTS

| | | |
|---|---|---|
| 642,916 | Great Britain | Sept. 13, 1950 |